Carl E. Renner
INVENTOR.

United States Patent Office 3,457,583
Patented July 29, 1969

3,457,583
VACUUM EJECTOR FOR FLUENT MATERIALS
Carl E. Renner, 3824 Rachel Ave.,
Port Arthur, Tex. 77640
Filed June 20, 1966, Ser. No. 558,663
Int. Cl. A47l 5/38
U.S. Cl. 15—314                               1 Claim

ABSTRACT OF THE DISCLOSURE

One end of a conduit is connected to a suction line while the opposite end of said conduit is connected to a source of positive pressure. A gravitational hopper means communicates with the conduit means and forces material deposited in the hopper means to the suction line for disposal. An angled branch communicates with an intermediate portion of the conduit and extends outwardly to a vacuum pickup means which sweeps up material and forces flow of the same into the suction line through the conduit when the aforementioned hopper means is selectably stopped.

---

The present invention generally appertains to improvements in vacuum systems for general cleaning and discharging purposes and more particularly relates to novel improvements in vacuum systems having attachable inlet adapters, which are provided for conveying various types of debris into the vacuum system so as to be conveyed and discharged thereby.

The present invention finds particular application in an environment in association with cargo lines of tank vessels, which are equipped with eduction systems that include a vacuum line.

An important object of the present invention is to provide a vacuum ejector for fluent materials, which operates in conjunction with a vacuum line and which is connected to the vacuum line and is adapted to convey slurries, muck and fluid suspended dirt, debris, sludge or the like residue under pressure into the vacuum line. The fluent materials are conveyed under liquid fluid pressure to the vacuum line, wherein they are ejected under the action of the vacuum source in the vacuum line.

A further important object of the present invention is to provide an attachable inlet adapter for a vacuum line with the inlet adapted conveying materials under pressure into the vacuum line, the materials being of any nature and the pressure being of any fluid-type pressure.

Another important object of the present invention is to provide an attachable inlet adapter, which is provided with a hopper-like means for the depositing of materials therein so as to be conveyed under fluid pressure into the vacuum line and which is also provided with a detachable, adjustable and extensible cleaning instrument that is structurally connected to and related with the inlet adapter so that material is picked up thereby by virtue of a vacuum created within the inlet adapter due to the fluid pressure therein and the orientation of the member to the adapter.

A further important object of the present invention is to provide a compact, sturdy and inexpensive, adjustable and readily attachable inlet adapter for a vacuum system, which finds particular utility in connection with cleaning compartments of tank vessels.

Figure 1:
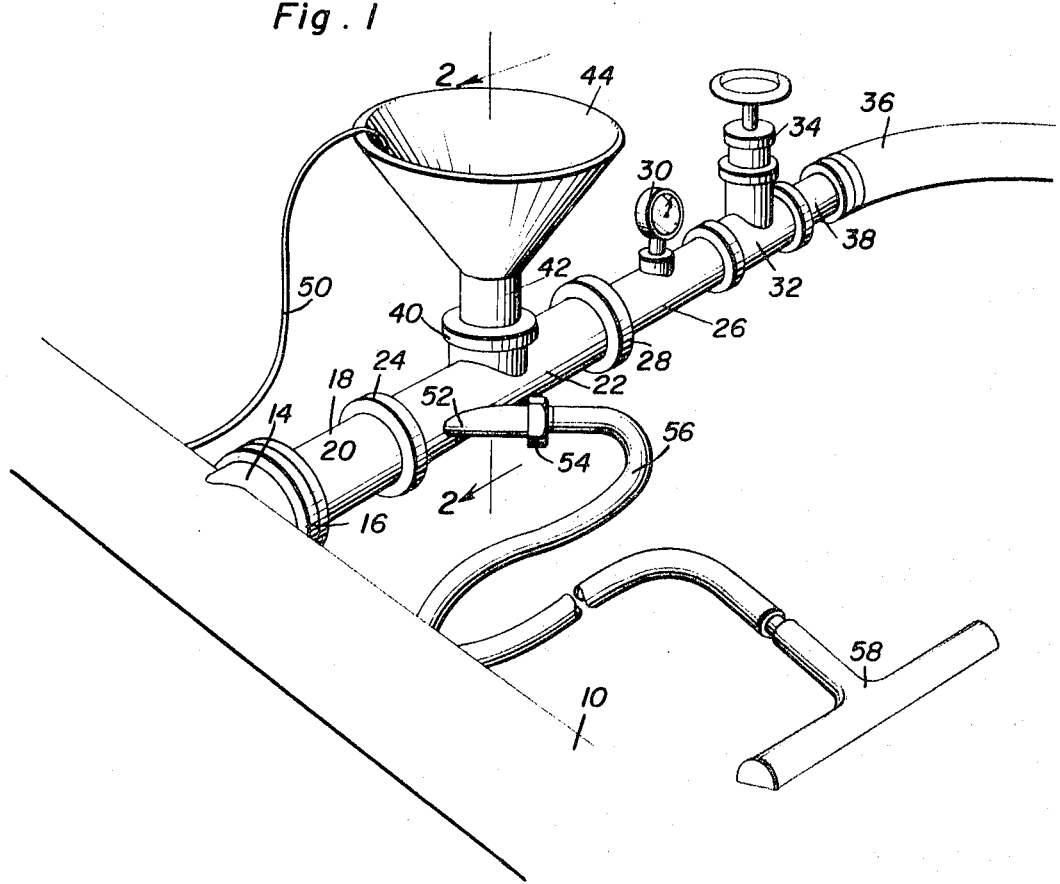
Figure 2:
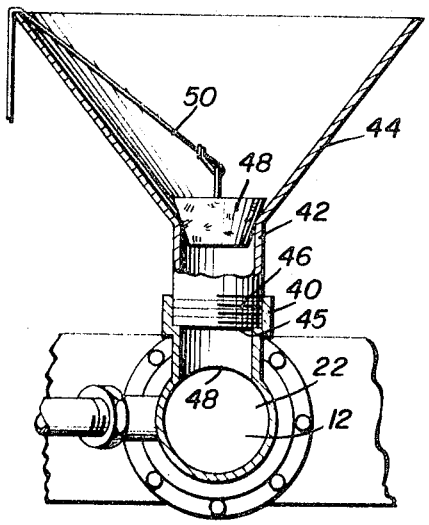

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the present invention, showing the same in attachment to a vacuum line, and FIGURE 2 is a vertical sectional view, taken substantially on line 2—2 of FIGURE 1.

Referring now more particularly to the accompanying drawing, the numeral 10 designates a conduit, which constitutes the main vacuum line of a vacuum system, that serves, in one environment, as a part of an eduction system onboard ship for conveying residue overboard through the ship's eduction system.

The conduit 10 is formed with a radial opening 12, surrounded by an integral, projecting collar 14, which terminates at its outer end in a flange 16. A connecting pipe 18 is formed at one end with a flange 20 that is secured, as by bolt assemblies or the like, in tightly fixed, abutting relation with the flange 16. The connecting pipe or conduit 18 has a conduit 22 secured to its outer end, by any suitable, air and fluid-tight attaching means, such as an internally threaded collar 24 and the opposite end of the conduit section 22 is secured to a pipe section 26 by a similar collar 28. The connecting pipe 14, adapter conduit section 22 and pipe 26 are disposed in axial alignment with the collar 14 and form a continuous conduit, having an internal cross-sectional area for the flow of pressure fluid through the opening 18 into the suction line 10.

A conventional pressure gage 30 is associated with the pipe section 26 so as to visually indicate the pressure of the fluid passing through the pipe section 26 and the adapter or conduit 22. A T-coupling 32 is secured to the end of the pipe section 26 and operatively supports a handwheel operated cut-off valve 34 of conventional construction. A flexible conduit or tubing 36, which extends from a fluid pressure source, is attached to the nipple 38 which projects from the T-coupling, whereby the fluid, which is under pressure, is conveyed by the flexible conduit 36 through the axially aligned piping and conduits and the adapter 22 into the suction line conduit 10.

The adapter pipe or conduit 26 is formed with an upstanding pipe 40, which supports the lower cylindrical end 42 of a frustoconical shaped hopper or container 44.

As shown in FIGURE 2, the upstanding pipe section 40 on the adapter conduit 22 is internally threaded to receive the exteriorly threaded lower end portion 46 of the cylindrical lower end portion 42 of the hopper or container 44. The adapter conduit section 22 is formed with a radial opening 45 whereby material deposited into the hopper or container 44 will gravitate in to the interior of the adapter pipe 22 and be conveyed by the pressure fluid passing therethrough into the vacuum pipe or conduit 10.

A stopper 48 is adapted to close off the hopper or container 44 and is of tapered construction and is formed from substantially rigid rubber or similar material and is tapered so that it can be tightly wedged into the lower end of the hopper 44 and extend into the cylindrical lower end portion 42 and close off the hopper whereby materials deposited into the hopper cannot gain access to the interior of the adapter conduit 22. The stopper or plug 48 is provided with a tethering line or lanyard 50, that may be attached to the conduit 10 or other fixed support, in any suitable manner.

The adapter conduit 22 is formed with an integral, angularly related, inlet fitting 52, which extends rearwardly therefrom and is disposed at an acute angle of approximately 45° to the conduit section 22. The inlet fitting 52 extends rearwardly, so that its communication with the interior of the adapter conduit section 22 is at an angle, sloped rearwardly, relative to the direction of flow of the pressure fluid toward the vacuum line 10. The outer end of the relatively short integral, inlet section 52 is threaded and, by means of a locking nut 54, securely receives one end of an elongated, flexible hose 56, which terminates at its other end in a vacuum or pick-up fixture 58.

The length of the hose 56 can be best determined by the particular placement and use of the inlet adapter and the length can vary.

In use, the conduit 10 will constitute a part of an eduction system and will serve as a vacuum line in a vacuum system (not shown). A fluid under pressure will be conveyed by the flexible conduit or tubing 36 and any residue materials, which are deposited in the container or hopper 44 will gravitate into the conduit section 22 and be picked up by the pressure fluid and carried into the vacuum line 10.

When it is desired to use the vacuum or pick-up fixture 58 with the flexible and extensible hose 56, the hopper is closed off by the plug or stopper 48 and the vacuum in the line 10, together with the fluid pressure, will serve to create a vacuum in the hose 56 so as to pick up any residue that may be engaged by the fixture 58. In this respect, it is to be noted that the inlet 52 which communicates the hose 56 with the conduit section 22 is disposed at an angle so that a suction will be created, within the conduit section 22, at such point to suck in or pull in the residue into the conduit section 62, the vacuum, at such point, under the fluid pressure passing through the pipe or conduit sections, being assisted by the vacuum in the main vacuum line 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. A vacuum ejector for fluent material comprising a source of positive pressure, a source of suction, a main conduit having a substantially uniform interior cross-section connected between the sources of positive pressure and suction, hopper means communicating with an intermediate section of the conduit, the pressure differential across the conduit causing the flow of hopper deposited material through the conduit to the source of suction, means for selectively plugging the hopper to prevent communication between the hopper and conduit, an inlet fitting angulated toward the suction source, the fitting having an inner end thereof communicating with an intermediate section of the conduit, a flexible hose section, the outer end of the inlet fitting being connected to the hose section, and vacuum pick-up means connected to the free end of the hose section for picking up residue material under the influence of suction present in the hose section.

References Cited

UNITED STATES PATENTS

| 549,702 | 11/1895 | Canfield | 4—295 |
| 999,485 | 8/1911 | Carolin. | |
| 1,439,722 | 12/1922 | Allyn | 302—27 |
| 3,070,403 | 12/1962 | Shelton | 302—52 |
| 2,973,993 | 3/1961 | Delagrange et al. | 302—59 |
| 3,186,769 | 6/1965 | Howlett | 302—25 X |

ROBERT W. MICHELL, Primary Examiner

U.S. Cl. X.R.

15—409